(12) United States Patent
Spencer et al.

(10) Patent No.: US 9,804,812 B2
(45) Date of Patent: Oct. 31, 2017

(54) IN-LINE REPORT PREVIEW, CAPTURE AND/OR RECALL

(71) Applicant: Bank of America Corporation, Charlotte, NC (US)

(72) Inventors: Marcie L. Spencer, Bowling Brook, IL (US); Mary R. Rosendahl, Wilmette, IL (US); Milton Santiago, Jr., Chicago, IL (US); Darin G. Mallory, Plainfield, IL (US)

(73) Assignee: Bank of America Corporation, Charlotte, NC (US)

( * ) Notice: Subject to any disclaimer, the term of this patent is extended or adjusted under 35 U.S.C. 154(b) by 313 days.

(21) Appl. No.: 14/588,434

(22) Filed: Jan. 1, 2015

(65) Prior Publication Data
US 2016/0196238 A1 Jul. 7, 2016

(51) Int. Cl.
*G06F 3/14* (2006.01)
*G06Q 40/02* (2012.01)
(52) U.S. Cl.
CPC .......... *G06F 3/1415* (2013.01); *G06Q 40/02* (2013.01)

(58) Field of Classification Search
None
See application file for complete search history.

(56) References Cited

U.S. PATENT DOCUMENTS

| | | | |
|---|---|---|---|
| 7,257,610 B2 | 8/2007 | Lai et al. | |
| 7,581,221 B2 | 8/2009 | Lai et al. | |
| 2003/0164850 A1* | 9/2003 | Rojewski | G06F 17/30899 715/733 |
| 2013/0167003 A1* | 6/2013 | Mueller | G06Q 10/06 715/221 |

* cited by examiner

*Primary Examiner* — Asher Kells
(74) *Attorney, Agent, or Firm* — Weiss & Arons LLP; Michael A. Springs, Esq.

(57) ABSTRACT

A method for generating an alert and/or a notification to a system user is provided. The method may include using a receiver to receive a user selection to capture a generated alert and/or report. At a point that is later in time than the user selection to capture, the method may further include using the receiver to receive a user instruction to recall the captured alert and/or report. The method may also include using the processor to update the fields associated with the captured alert and/or report. In addition, the method may include using the processor to display the alert and/or report based on the updated fields.

8 Claims, 6 Drawing Sheets

| 404 | ⊟ Balances ―402 | | 406 | 408 | ↻ ☒ |
|---|---|---|---|---|---|
| | ┌Accounts | Totals | Opening AvailBalance(040) ▾ | | |

410  412 ○Previous Day   ⦿Current Day   Clear Filters   Options ▾ 418

| As of... | Account # | Account... | Bank ID | Amount | Curre... |
|---|---|---|---|---|---|
| | | | | | ▾ 420 |
| 414 XXXXXXXXXX | ABC CORP. | XXXXXXXXXX | XXX,XXX.XX | USD | 416 |
| X12/17/2013 XXXXXXXXXX | ABC CORP. | XXXXXXXXXX | XXX,XXX.XX | USD | |
| X12/17/2013 XXXXXXXXXX | ABC CORP. | XXXXXXXXXX | XXX,XXX.XX | USD | |
| XXXXXXXXXX | ABC CORP. | XXXXXXXXXX | XXX,XXX.XX | USD | |
| X12/17/2013 XXXXXXXXXX | ABC CORP. | XXXXXXXXXX | XXX,XXX.XX | USD | |
| XXXXXXXXXX | ABC CORP. | XXXXXXXXXX | XXX,XXX.XX | USD | |
| X12/17/2013 XXXXXXXXXX | ABC CORP. | XXXXXXXXXX | XXX,XXX.XX | USD | |

97 Accounts          ◁◁  Page: [ 1 ] of 4  ▷▷

FIG. 4

Manage Remitters ~502

Search ~504

☐ Remitters    Viewing 9 of 9    ⚷ ✚Add Remitter    ⟐Import File ~507
                                        ~505
☐ Remitter Name 1 (3)    Remitter Detail
                         Name: Remitter Name 1

☐ Remitter Name 2 (6)    Account ~512    Bank ID ~508    Date Modified ~510    Edit 3 Records ~512

☐ Remitter Name 3 (3)            XXXXXXXXXX    XXXXXXXXXX    XXXXXXXXXX

☐ Remitter Name 4 (2)    XXXXXXXXXX    XXXXXXXXXX    XXXXXXXXXX    ⌕ ~514

☐ Remitter Name 5 (3)    XXXXXXXXXX    XXXXXXXXXX    XXXXXXXXXX

☐ Remitter Name 6 (2)

☐ Remitter Name 7 (1)

☐ Remitter Name 8 (2)

☐ Remitter Name 9 (6)

9 Remitters Selected   Display Selected
[Delete]  [Export]

FIG. 5

IN-LINE REPORT PREVIEW, CAPTURE AND/OR RECALL

FIELD OF TECHNOLOGY

The disclosure relates to mechanisms for enhancing reporting. Specifically, this disclosure relates to mechanisms for enhancing efficiency of report preview, generation and handling by a user.

BACKGROUND OF THE DISCLOSURE

Reporting may perform an important role in treasury management activity, addressing regulatory requirements, structuring advice on controls and processing system weaknesses and providing advice on use of various accounting treatments for complex transactions.

Reporting functionality for certain software and/or hardware applications often requires separate software modules and/or hardware modules that reside independently of the application generating the reported information.

It would be desirable to join the reporting modules more closely to the application generating the reported information.

SUMMARY

A method for capturing a user-designated alert and/or report may include using a processor to track user navigation through an electronic alert and/or record-generating system. The method may also include using a processor to record the user navigation and using a receiver to receive a user selection to capture a location in the user navigation. At a point that is later in time than the user selection to capture, the method may further include using the receiver to receive a user instruction to recall the location in the user navigation. In addition, the method may include using the processor to update the fields associated with the location in the user navigation. The method may also include using the processor to execute an alert and/or a report based on the location of the user navigation.

BRIEF DESCRIPTION OF THE FIGURES

The objects and advantages of the invention will be apparent upon consideration of the following detailed description, taken in conjunction with the accompanying drawings, in which like reference characters refer to like parts throughout, and in which:

FIG. 4 shows another exemplary GUI according to certain embodiments of the invention;

FIG. 5 shows yet another GUI according to certain embodiments of the invention.

DETAILED DESCRIPTION OF THE DISCLOSURE

Figure 1:
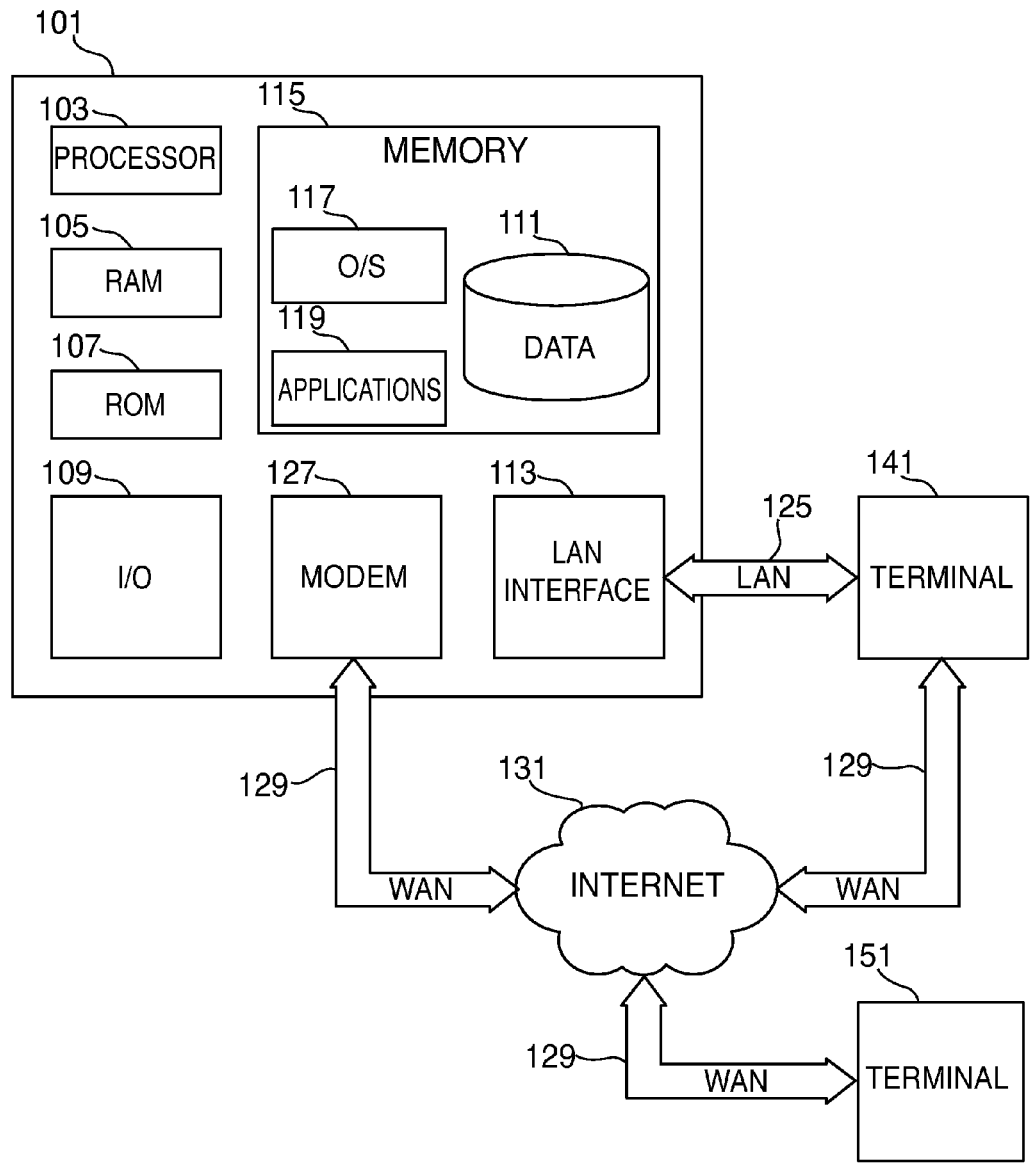
FIG. 1 shows illustrative apparatus in accordance with the principles of the invention.

Systems and methods for configuring a computer to execute a method for providing an electronic platform that enables a user to share a preview of an alert and/or report are provided. While the following description focuses primarily on methods associated with the use of an electronic platform, it should be noted that scope of the invention described herein extends to the implementation of such methods on dedicated computers that have been designed and constructed specifically for the implementation of such methods. Such computers may typically be referred to as ASICs (Application Specific Integrated Circuits.)

Certain embodiments of a method for using the platform may include using a processor to construct an alert and/or report for later compilation. The method may also include using a processor to enable a user to preview a compiled alert and/or report. In certain embodiments, the method may enable a user to use a transmitter to share, substantially simultaneously with previewing the compiled alert and/or report, the compiled alert and/or report with other users. Each of the other users may be associated with a workstation connected by an electronic connection with the processor. The method may also include enabling a receiver to receive comments associated with the compiled alert and/or report from the other users.

In certain embodiments, the method may enable a user to use a transmitter to share a preview of a compiled alert and/or report. It should be noted that the compiled alert and/or report may be shared with other users only after the user has reviewed the alert or report. It should further be noted that the compiled alert and/or report may be shared with other users only after the user has reviewed and edited the alert and/or report.

In some embodiments, the alerts and/or reports are displayed on the workstation of the other users as an overlay on a display screen of the workstation. The alerts and/or reports overlay may interrupt an application process running on the screen of the workstation of the other users.

In certain embodiments, the transmission to the workstation of other users may enable an opportunity at the workstation of the other users to receive comments on the alerts and/or the reports.

In certain embodiments, the transmission to the workstation of the other users may enable an opportunity at the workstation of the other users to request a user-grantable delay to send comments on the alerts and/or the reports.

Certain embodiments may also include configuring a computer to execute a method for an alert and/or a notification to a system user. The method may include using a receiver to receive a user selection to capture a generated alert and/or report. At a point that is later in time than the user selection to capture, the method may also include using the receiver to receive a user instruction to recall the captured alert and/or report. In addition, the method may include using the processor to update the fields associated with the captured alert and/or report. Also, the method may include using the processor to display the alert and/or report based on the updated fields.

In certain embodiments, the capture may be implemented inline with the using the processor for generating the alert and/or the notification.

For the purposes of this application, an inline capture may preferably include the compiler of such a capture to substitute the body of the capture inline by placing the capture as an inline code within the alert and/or the notification itself—i.e., by creating an inserting the code in a location in the application that generates the alert and/or the notification.

The inline characteristic of the capture preferably accomplishes at least two important goals. First, the inline capture allows the user to capture the characteristics of the presently designed and selected conditions.

For example, if a treasury professional had determined that it was important to obtain the values of incoming, but not yet credited, funds for a pre-determined entity location, and the treasury professional had designed a search and retrieve function to obtain such information, then, from within the same application that the search and retrieve had been designed and selected, the user could elect to capture the designed and selected function for later recall as an alert and/or a report. Thus, such a system saves the user the requirement of redesigning and re-entering, in a free-standing alerting and/or reporting application, a function that the user had already obtained using an application designed for retrieving desired information. Rather, the user could simply capture the currently designed and selected functions for recall at a later time and/or date. Preferably, the recall at a later time and/or date could reflect updated values. In some such embodiments, the user could preferably schedule recall of the captured conditions to form a periodic alert and/or report.

Second, the inline capture saves the overhead of having to leave the application in order to invoke the capture function invocation and then return to the application. While inline functions run faster than the normal functions as function-calling overheads are saved, nevertheless there may be a memory penalty associated therewith. For example, the inline capture may increase the size of the alert and/or notification application itself.

Yet another advantage of the inline capture is that the user can capture the location of the generated alert and/or notification without have to leave the application and, in so doing, lose the location and/or characteristics of the generated alert and/or notification. In such conventional systems that require the user to leave the application, the user may be required to recreate the steps taken by him or her to create the capture in the first instance.

An inline capture may be reused at a later time to replicate future alerts and/or reports that update the information related to the captured BAI codes. Accordingly, such embodiments may enable the user to set up the alert and/or report without leaving the application while providing a template for future updating associated with the codes embedded in the conditions and/or parameters that the user has captured.

In certain embodiments, the capture may be inline with an application that supports the using the processor for generating the alert and/or the notification.

In response to a generation of the alert and/or report, the method may include enabling a user to share a preview of the generated alert and/or report with other users.

The method may also include enabling the user to display the alert and/or report on the other users' workstations following the updating of the fields associated with the captured report.

Certain embodiments of the method may include installing, for use with a pre-determined application screen, an icon on the user's display. The icon may preferably enable the user to instruct the processor to update the fields in the captured alert and/or report and display the alert and/or report based on the updated fields.

In certain embodiments, the method may include using a processor to enable a user to use a transmitter to share, substantially simultaneously with viewing the compiled alert and/or report, the compiled alert and/or report with other users. Each of the other users may be associated with a workstation connected by an electronic connection with the processor.

Some methods may enable a receiver to receive comments associated with the compiled alert and/or report from the other users.

Other methods may include configuring a computer to execute a method for generating an alert and/or a notification to a system user. Such a method may include using a processor to track user navigation through an electronic alert and/or record-generating system. The methods may also include using a processor to record the user navigation, using a receiver to receive a user selection to capture a location in the user navigation, and, at a point that is later in time than the user selection to capture, using the receiver to receive a user instruction to recall the location in the user navigation. Before, during or after the recall of the location, the methods may include updating the fields associated with the location in the user navigation and executing an alert and/or a report based on the retrieved location of the user navigation.

With respect to these methods, as well, such methods may also include enabling a user to share a preview of the generated alert and/or report with other users in response to a generation of the alert and/or report.

Such methods may also include enabling the user to display the alert and/or report on the users' workstations following the updating of the fields associated with the captured report.

With respect to this embodiment as well, the processor may be configured to install, for use with a pre-determined application screen, an icon on the user's display that enables the user to instruct the processor update the fields in the captured alert and/or report and display the alert and/or report based on the updated fields. Further, the processor may be used to enable a user to use a transmitter to share, substantially simultaneously with viewing the compiled alert and/or report, the compiled alert and/or report with other users. Each of the other users may preferably be associated with a workstation connected by an electronic connection with the processor.

The methods may also enable a receiver to receive comments associated with the compiled alert and/or report from the other users.

As described above, the methods may use the processor for a capture that is inline with using the processor to track user navigation through an electronic alert and/or record-generating system.

Certain embodiments may involve a capture that is inline with an application that supports the using a processor to track user navigation through an electronic alert and/or record-generating system.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art upon reading the following disclosure, the embodiments may be embodied as a method, a data processing system, or a computer program product. Accordingly, the embodiments may take the form of an entirely hardware embodiment, an entirely software embodiment or an embodiment combining software and hardware aspects.

Furthermore, embodiments may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Exemplary embodiments may be embodied at least partially in hardware and include one or more databases, receivers, transmitters, processors, modules including hardware and/or any other suitable hardware. Furthermore, operations executed may be performed by the one or more databases, receivers, transmitters, processors and/or modules including hardware.

FIG. 1 is a block diagram that illustrates a generic computing device 101 (alternately referred to herein as a "server") that may be used according to an illustrative embodiment of the invention. The computer server 101 may have a processor 103 for controlling overall operation of the server and its associated components, including RAM 105, ROM 107, input/output module 109, and memory 115.

Input/output ("I/O") module 109 may include a microphone, keypad, touch screen, and/or stylus through which a user of server 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by server 101, such as an operating system 117, application programs 119, and an associated database 111. Alternately, some or all of server 101 computer executable instructions may be embodied in hardware or firmware (not shown). As described in detail below, database 111 may provide storage for transferring information input into one or more of the database(s) described herein, as well as user navigation information, user-designed search characteristics, user and/or entity treasury information, transaction information, check information, automated clearinghouse information ("ACH"), etc.

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 113. When used in a WAN networking environment, server 101 may include a modem 127 or other means for establishing communications over WAN 129, such as Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages via the World Wide Web from a web-based server. Any of various conventional web browsers can be used to display and manipulate data on web pages.

Additionally, application program 119, which may be used by server 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

A terminal such as 141 or 151 may be used by a user of the embodiments set forth herein. Information input may be stored in memory 115. The input information may be processed by an application such as one of applications 119.

Figure 2:
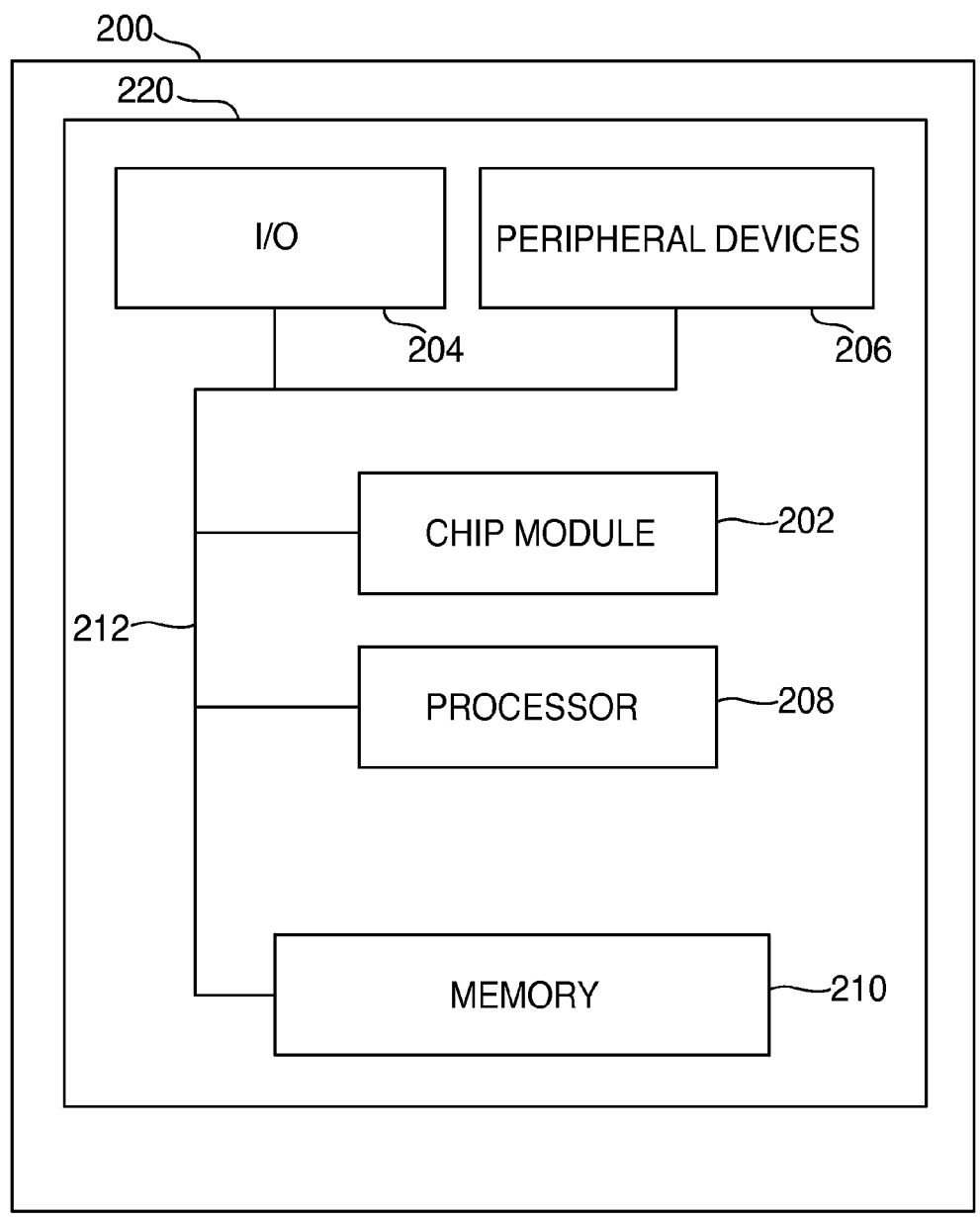
FIG. 2 shows another illustrative apparatus in accordance with the principles of the invention.

FIG. 2 shows an illustrative apparatus that may be configured in accordance with the principles of the invention.

FIG. 2 shows illustrative apparatus 200. Apparatus 200 may be a computing machine. Apparatus 200 may be included in apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include the transmitter device and the receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device ("processor") 208, which may compute data structural information, structural parameters of the data, quantify indices; and machine-readable memory 210.

Machine-readable memory 210 may be configured to store in machine-readable data structures: CPG information, financial institution ("FI") information, customer benefit offer information; customer information and any other suitable information or data structures.

Components 202, 204, 206, 208 and 210 may be coupled together by a system bus or other interconnections 212 and may be present on one or more circuit boards such as 220. In some embodiments, the components may be integrated into a single silicon-based chip.

Apparatus 200 may operate in a networked environment supporting connections to one or more remote computers via a local area network (LAN), a wide area network (WAN), or other suitable networks. When used in a LAN networking environment, apparatus 200 may be connected to the LAN through a network interface or adapter in I/O circuitry 204. When used in a WAN networking environment, apparatus 200 may include a modem or other means for establishing communications over the WAN. It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to operate processor 208, for example over the Internet.

Apparatus 200 may be included in numerous general purpose or special purpose computing system environments or configurations. Examples of well-known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, tablets, programmable consumer electronics, network PCs, minicomputers, mainframe computers, distributed computing environments that include any of the above systems or devices, and the like.

Figure 3:
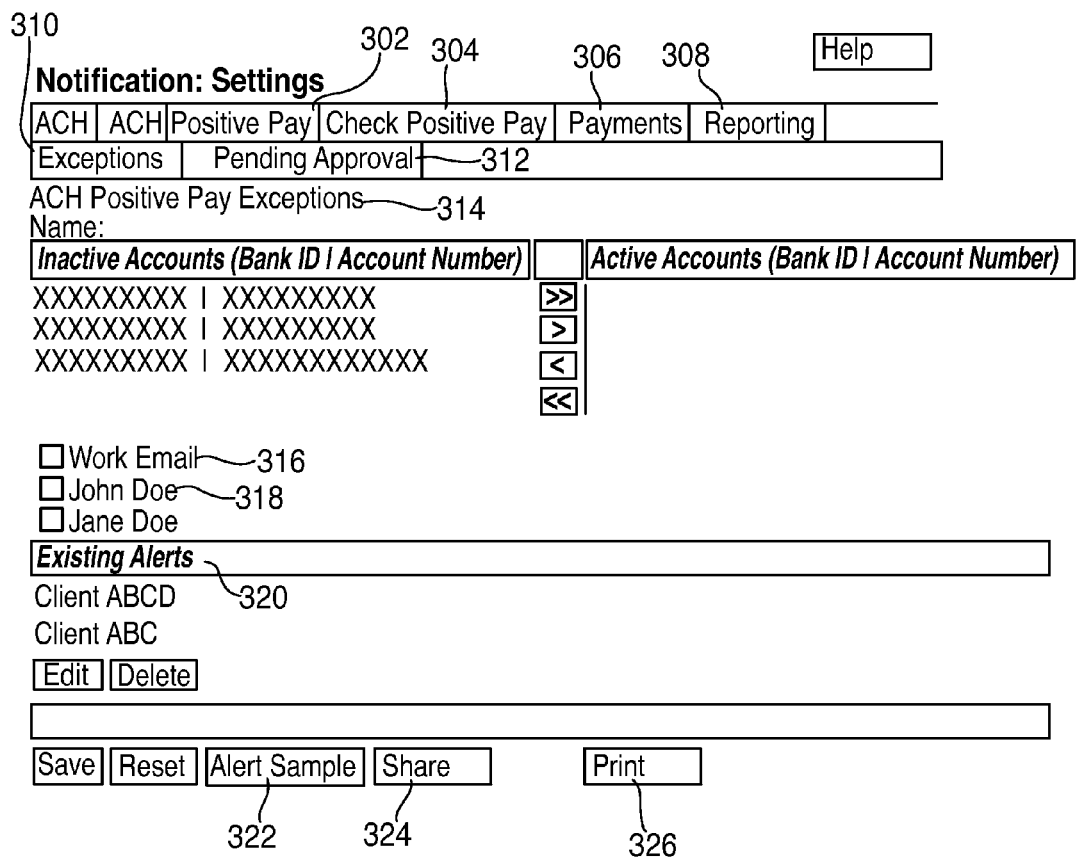
FIG. 3 shows an exemplary Graphical User Interface ("GUI") according to certain embodiments of the invention.

FIG. 3 shows a first illustrative GUI according to certain embodiments. The GUI shows a screen for setting notifications for various aspects of a treasury account.

The screen includes a series of tabs for selecting various sub-screens. Each of the sub-screens preferably correspond to an aspect of a treasury account.

The tabs include a tab for Positive Pay TM 302 which indicates a screen manufactured by Bank of America Corporation of Charlotte, N.C. Positive Pay TM may enable a user to review transactions that have been initiated but not yet been completed. Check Positive Pay 304 may enable a user to review check transactions that have been initiated but not been completed.

Payments tab 306 may preferably enable a user to review other payment transactions that have been initiated but not yet been completed. Reporting tab 308 may preferably enable a user to select certain reporting functionalities. Such reporting functionalities are described in more detail below in the portion of the specification corresponding to FIGS. 4 and 5.

The screen shown in FIG. 3 preferably corresponds to exceptions generated in an ACH Positive Pay report. An exception to such an ACH Positive Pay report may be understood to be a discrepancy between an expected value of an ACH—i.e., a value of the ACH as intended by the transmitter of the ACH—and a value associated with the ACH that the beneficiary is intending to claim.

It should be noted that similar exceptions may also occur in check transactions and may also form such an exception notification report.

Field 310 shows that such exceptions 310 may be pending approval 312. Field 314 shows that the report shown in the screen is limited to ACH positive pay exceptions. Such a Positive Pay system, whereby users may have the opportunity to select whether to complete the transaction or not, may affect the timing of the transmission. Whereas a typical domestic ACH may be credited to the beneficiary in not more than 16 hours, an ACH within the Positive Pay system may take longer pursuant to the right of refusal by the transmitter of the ACH. Such timing may include an extension pursuant to a pre-determined window of time to allow the transmitter to review and/or clear the exception.

In certain embodiments, a system may preferably take action following such an extension. For example, independent additional instructions from the transmitter, the system may preferably execute the ACH absent additional instructions.

Work e-mail 316 shows an auto default user profile. Such a default user profile may preferably show a preferably auto-selected contact point for all communications with the user. Preferably, certain embodiments may also enable the addition of contact points, such as the contact points shown at 318 and 320.

Certain embodiments may also include a drop down list of users (not shown). Such a drop down list may provide the ability to enter a user ID or other identifier. The system may, preferably in response to receipt of the user ID or other identifier, retrieve stored contact information associated with the user ID or other identifier.

Such stored contact information may then be used to link the other user(s) to the reports page and/or to share with the users. Existing alerts, which may be shared among a number of users, may include alerts associated with pre-determined clients, such as the alerts shown in field 320.

In some embodiments relating to share reports, fields 322 and 324 shows an "alert sample" which may be "shared". This combination indicates that, preferably prior to generating reports, certain sample reports may be shared among various users. Such shared sample reports may preferably allow the various users to comment on the reports and allow the user responsible for report generation to receive the comments and modify the reports accordingly. Because the comments are received on the sample reports, the later-in-time generated reports may be more accurately mapped in accordance with the designated user population.

From a technical perspective, the generation of sample alerts and/or reports may preferably involve one or more of various modes transmission of sample reports to designated users. For example, such alerts and/or reports may be transmitted via e-mail or other electronic transmission medium.

In some embodiments, the alerts and/or reports may be sent as an overlay on the screen of the designated users. Such an overlay may preferably involve an interrupt of the process of the designated users. Such an interrupt may also be accompanied by an opportunity to send comments and/or a request to delay transmission of comments. Such a request to delay transmission of comments may, in certain embodiments, be sent with a grantable request to the user responsible for generation of the alerts and/or reports.

Certain embodiments of the screen shown in FIG. 3 may be revised to show information such as listings of frequently used alerts and samples for formation thereof. In certain embodiments, other screens may be included in such configurations as, "users who subscribe to these alerts, typically also subscribe to these alerts as well . . . ."

Some embodiments may also allow for printing of alerts, sample alerts or any other information that may appear on the screen, as shown by field 326.

FIG. 4 shows in-application notification feature(s). Such features preferably enable a user to set up an alert without leaving the application in which the user currently operates.

FIG. 4 shows, for example alerts triggered by the highest incoming volume in account balances 402, 404 associated with incoming receivables on individual accounts. Other available tabs in the screen shown in FIG. 4 may include totals 406 and opening available balances. Such tabs preferably correspond to predetermined BAI or BAI2[1] codes. Such codes may specify, for example average closing ledger balance, average opening available, total adjustment disbursement credits, cumulative credits and/or return item debits. Such codes may also specify, in addition or in the alternative, transaction types such as ACH and wire incoming payments, return item debits and credits, ACH and wire outgoing payments and/or deposits.

[1] BAI2 (Bank Administration Institute, Cash Management Balance Reporting Specifications Version 2) data can be downloaded from the web service according to the invention and parsed into an XML format. There can be multiple BAI2 data files (1 per day) and they can follow the naming pattern XXXXXXXX.bai where XXXXXXXX is the date of the file (i.e. 04112005).

FIG. 4 also includes information such as date 410, account number 412, account name 414, bank ID 416, amount 418 and/or currency 420. It should be noted that FIG. 4 may represent a particular screen to which a user has navigated. In some embodiments, the user may capture the screen, and the BAI codes associated therewith, to form a reporting template. Such a capture may be referred to herein as an inline capture.

In certain embodiments of in-line alert and/or report capture, the technological aspects may require that the machine upon which such capture may be implemented may store the steps of any particular process presently ongoing on a user's machine. For example, if a user navigated to a pre-determined portion of notifications, such as the notification screen shown in FIG. 4, the machine may preferably store the various process steps engaged in by the user to arrive at the screen. Following capture, by the user, of the present screen, the system may then reconstruct the user experience, and, in response to later-in-time user input, recreate the steps needed to recall the present notification screen. Alternatively, the system may jump the prior steps and produce a replication of the notification screen based on the various BAI codes used to provide the notification in the first instance.

FIG. 5 shows an exemplary screen for use with recall of an in-line alert and/or report capture, similar to the alerts and/or reports described above in the portion of the specification associated with FIG. 4. FIG. 5 shows, for example a manage screen for remitters 502. It should be noted that the screen shown in FIG. 5 relates to alerts and/or notifications associated with accounts receivable. The manage screen 502 may preferably include a search field, and add remitter field and/or an import file field.

For managing an exemplary remitter, the screen shows an account field 506, a bank ID field 508, a date modified field 510 and an edit field. In addition, the screen 502 shows an exemplary placement of an icon 514. Icon 514 may preferably be selected by a user and a previously-captured alert and/or report may be recalled. Such recall may enable a user to see an updated version of the report that he or she previously designated.

As such, systems and methods according to the invention may preferably provide an efficient, preferably end-to-end solutions for sharing previewed alerts and/or reports, capturing alerts and/or reports for later recall, and providing mechanisms for recalling updated reports at a later-point-in time than the time of original designation of the reports.

Figure 6:
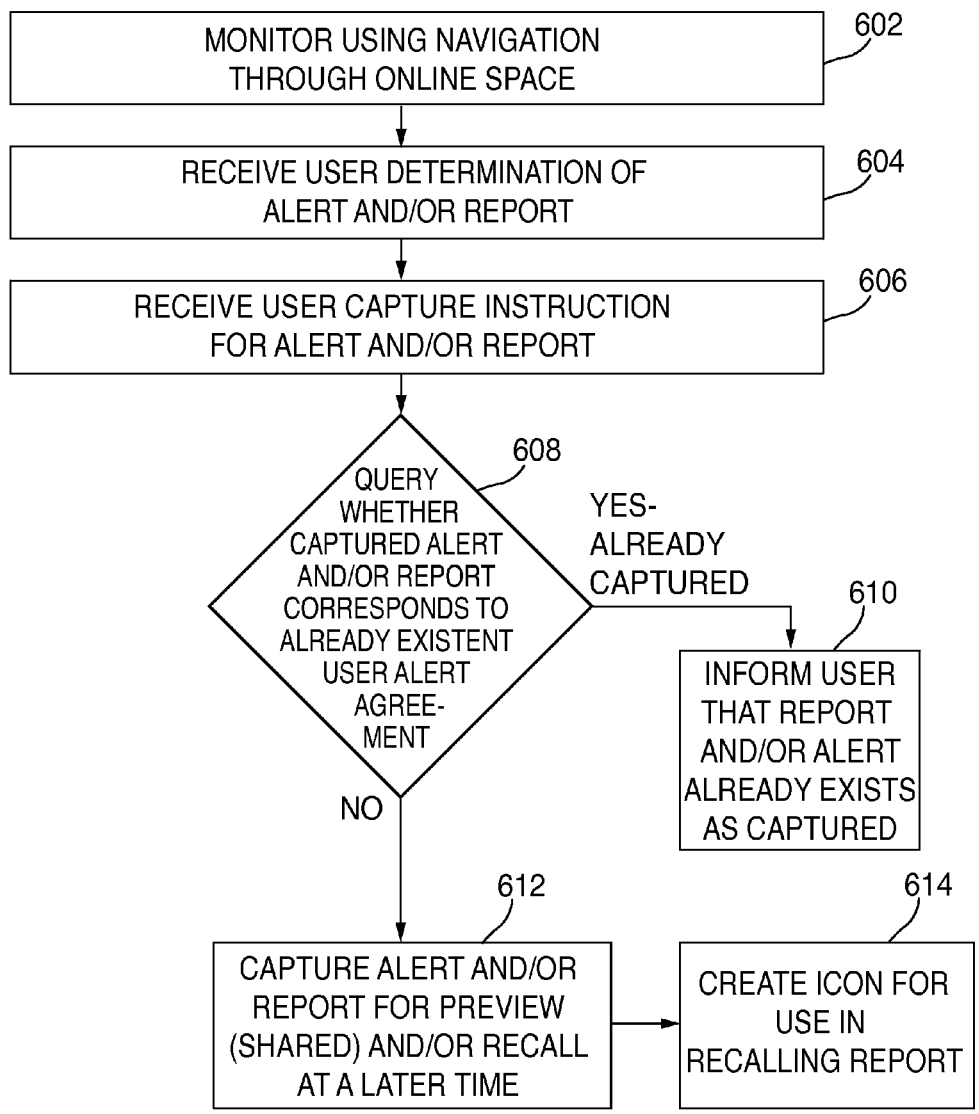
FIG. 6 shows an illustrative flow diagram according to the invention.

FIG. 6 shows an illustrative flow diagram according to certain embodiments of the invention. Step 602 shows monitoring user navigation through an online space. Step 604 shows receiving preferably inline user designation of an alert and/or report. Step 606 shows receiving user a capture instruction for the designated alert and/or report.

Step 608 queries whether the captured alert and/or report corresponds to an already existent user alert and/or report. Step 610 concludes that, if the captured alert and/or report corresponds to an already existent user alert and/or report, then the user can be reminded of the existence of such a captured alert and/or report.

Step 612 shows that, if the captured alert and/or report does not correspond to an already existent user alert and/or report, then the systems and/or methods preferably capture the alert and/or report for recall at a later time. Step 614 shows that an icon may be created for use in later recall of the report.

It should be noted that while much of the description herein is devoted to methods, the scope of the invention includes apparatus as well. In addition, while the description of the above has been divided into many different embodiments, it should be noted that each of the embodiments may be used, in whole or in part, together with the other embodiments described herein.

Thus, methods and apparatus for providing in-line report preview, capture and/or recall mechanisms have been provided. Persons skilled in the art will appreciate that the present invention can be practiced in embodiments other than the described embodiments, which are presented for purposes of illustration rather than of limitation, and that the present invention is limited only by the claims that follow.

What is claimed is:

1. An article of manufacture comprising a non-transitory computer usable medium having computer readable program code embodied therein, the code when executed by one or more processors for configuring a computer to execute a method for in-application notification, a method comprising:
   using a processor to track user navigation through a reporting application;
   using a processor to record the user navigation;
   using a receiver to receive a user selection to capture a location in the user navigation, the location corresponding to a set of user-designed reporting conditions, each reporting condition comprising a reporting value;
   using the processor:
      capturing the selected location; and
      instructing a compiler to insert the location as in-line code within the application;
   at a point that is later in time than the user selection to capture, using the receiver to receive a user instruction to recall the location in the user navigation, the recall identifying the user-designed reporting conditions;
   using the processor to update one or more of the reporting values associated with the location in the user navigation; and
   using the processor to execute an alert and/or a report based on the location of the user navigation, the alert and/or report comprising the updated reporting value(s).

2. The method of claim 1, further comprising, in response to a executing the alert and/or report, enabling a user to share a preview of the alert and/or report with other users.

3. The method of claim 2, further comprising enabling the user to display the alert and/or report on one or more workstations associated with the other users.

4. The method of claim 1, further comprising using the processor to install, for use with a pre-determined application screen, an icon on a user display, wherein the icon enables a user to instruct the processor update the reporting values for the captured location corresponding to the set of user specified reporting conditions and display the alert and/or report corresponding to the updated reporting values.

5. The method of claim 1 further comprising using a processor to enable a user to use a transmitter to share, substantially simultaneously with viewing the alert and/or report, the alert and/or report with other users, each of said other users associated with a workstation connected by an electronic connection with the processor.

6. The method of claim 5 further comprising enabling a receiver to receive comments associated with the alert and/or report from the other users.

7. The method of claim 1 wherein the using the processor to capture the location is in-line with using the processor to track user navigation through the reporting application.

8. The method of claim 1 wherein using the processor to capture the location is in-line with an application that supports using the processor to track user navigation through the reporting application.

* * * * *